United States Patent Office 3,755,450
Patented Aug. 28, 1973

3,755,450
FREE-FLOWING UV ABSORBER COMPOSITIONS WITH MAGNESIUM OR ZINC SALTS OF FATTY ACIDS
Robert F. Anderson, Flemington, and George A. Menghi, Piscataway, N.J., assignors to American Cyanamid Company, Stamford, Conn.
No Drawing. Filed July 31, 1969, Ser. No. 846,585
Int. Cl. C07c 49/82
U.S. Cl. 260—591                8 Claims

ABSTRACT OF THE DISCLOSURE

Free-flowing 2-hydroxy-4-alkoxybenzophenones are provided by a process comprising admixing said alkoxybenzophenone and from about 1% to about 10% by weight of a magnesium or zinc salt of a saturated fatty acid containing from about 12 to about 20 carbon atoms.

---

This invention relates to improved free-flowing ultraviolet absorber compositions. More particularly, it relates to compositions of hydroxyalkoxybenzophenone ultraviolet absorbers of low melting point whose improved physical properties make them easier to handle during storage and during incorporation into polymeric formulations.

Most polymeric formulations contain ultraviolet stabilizers, antioxidants, plasticizers and other additives to impart desired characteristics to the final manufactured product. In many thermoforming processes, the stabilizers and other additives are incorporated into the polymer by charging the additive in the form of small solid particles through a hopper or other feed channel into a heated mixing zone such as an extruder or Banbury mixer wherein a molten polymer and the additive are thoroughly admixed and blended. Frequently, for ease in handling, a resin masterbatch containing the additive is first prepared. This is done by first dry blending the additive with a limited amount of polymer and then charging this concentrated blend through a hopper or feed channel into a heated mixing zone wherein the resin masterbatch is admixed with the bulk of the polymer and is thoroughly blended therewith. Regardless of whether the additive is used for making a masterbatch or whether it is blended directly with the main portion of the resin, the handling characteristics as to pourability and flowability during the feed and blending operations are extremely important. It is desirable that the additive have free-flowing characteristics so that it will pass smoothly and uniformly through the hopper or feed channel into the processing equipment.

It is also desirable for the additive to retain its free-flowing characteristics at higher temperatures. Many polymer compounding and formulation procedures are carried out at elevated temperatures. Since many polymer additives may often be stored for periods of time between their manufacture and their use in close proximity to the heated mixing zones, it is also considered desirable for such additives not to lose their free-flowing characteristics during such storage periods when exposed to elevated temperatures.

2-hydroxy-4-alkoxybenzophenones having the general formula:

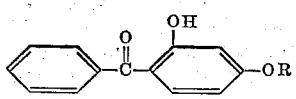

wherein R is an alkyl group containing from 1 to about 20 carbon atoms and a melting point below about 70° C., are well known ultraviolet absorbers which have experienced considerable use as additives for polymers. Although their flow characteristics are often sufficiently satisfactory to permit their addition to polymer formulations in the manner described hereinabove, they have a pronounced tendency to become sticky and to compact particularly at higher temperatures approaching their melting points. Benzophenones of the above formula generally melt at temperatures below about 70° C. Since many blending and thermoforming processes are conducted at temperatures from about 40° C. to substantially above about 70° C., substantial caking and compacting has been encountered in the use of these materials resulting in fouling of process lines, intermittent throughput and inhomogenity in the final product.

Accordingly, it is an object of this invention to provide improved free-flowing ultraviolet absorber compositions which maintain their flowability at temperatures encountered in normal thermal processing operations. It is another object of this invention to provide improved ultraviolet absorber compositions which retain their free-flowing characteristics upon storage.

These and other objects are accomplished in accordance with the present invention which provides improved free-flowing ultraviolet absorber compositions comprising 2-hydroxy-4-alkoxybenzophenones of the formula:

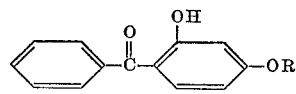

wherein R is an alkyl group containing from about 1 to about 20 carbon atoms and which melts below about 70° C. in admixture with metallic salts of fatty acids, said metallic salts being selected from the group consisting of magnesium and zinc salts of saturated fatty acids of from about 12 to about 20 carbon atoms.

It has been found in the present invention that the addition of magnesium or zinc salts of saturated fatty acids of from about 12 to about 20 carbon atoms such as magnesium or zinc stearate to the 2-hydroxy-4-alkoxybenzophenone reduces the compacting tendency under normal production, packaging, and storage and use conditions both at ambient temperatures and at higher temperatures, prevents caking and imparts a more free-flowing nature to the products.

Metallic salts of fatty acids have heretofore been used as lubricants for polymers to improve the melt flow of the polymer and to reduce the adhesion thereof to processing equipment. Also, these metallic salts have been used as dehydrochlorination inhibitors in chlorine-containing polymers or to serve as stabilizers in polymeric systems often in combination with other stabilizers. They have also been used as anticaking agents for high melting inorganic materials. It is surprising, however, that magnesium or zinc salts of fatty acids as described above can improve the free-flowing properties of low melting organic 2-hydroxy-4-alkoxybenzophenones of the general formula set forth hereinabove since it has been found that the effect continues even up to temperatures approaching the melting point of the benzophenones, i.e., about 40° C. or above. At these temperatures, the benzophenones normally become tacky and tend to cake.

The 2-hydroxy-4-alkoxybenzophenones whose free-flowing properties are enhanced by the addition of the magnesium or zinc salts in accordance with the present invention are those represented by the formula:

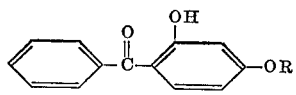

wherein R is an alkyl group containing from about 1 to about 20 carbon atoms and which melt at a temperature below about 70° C. Illustrative of such benzophenones are 2-hydroxy-4-methoxybenzophenone, 2-hydroxy-4-octyloxybenzophenone, 2 - hydroxy - 4-decycloxybenzophenone, 2-hydroxy-4-dodecyloxybenzophenone and the like.

The magnesium and zinc salts useful in the present invention are those derived from saturated fatty acids containing from about 12 to about 20 carbon atoms. Thus, for example, magnesium or zinc salts of lauric acid, myristic acid, palmitic acid, stearic acid and the like can be suitably employed. Preferably, however, the magnesium and zinc stearates are employed.

The hydroxybenzophenones and the magnesium and zinc salts as described above can be combined by any conventional method of mixing which insures a uniform blend and coating of the hydroxyalkoxybenzophenone particle by said metallic salt. For example, the benzophenone and the salts can be fed through a micropulverizer which breaks up agglomerated benzophenone particles into a blender. The dry blender is operated for a suitable period of time, for example, for about two hours and the resting uniform blend is then loaded directly into drums for shipment. Alternatively, the metallic salt can be added to the hydroxyalkoxybenzophenone during the final steps of the manufacturing process for the benzophenone. In this process, the manufactured benzophenone is dried in a blender dryer, then dropped onto a mill for grinding and finally placed in drums for commercial use. It is convenient to add the metallic salts to the benzophenone in the blender dryer thereby obtaining a thoroughly and uniformly blended product.

The amount of metallic salt added to the benzophenone is not considered critical and can vary widely from about 1% by weight based on the weight of the benzophenone up to about 10% by weight. Use of less than about 1% by weight will not result in discernible improvement in the free-flowing characteristics of the ultraviolet absorber. Use of more than 10% by weight is impractical from an economic point of view, there being very little further improvement in properties of the benzophenone. Preferably, from about 4½ to about 5½% by weight of the metallic salt is added to the benzophenone.

Differences between unblended 2-hydroxy-4-alkoxbenzophenones and the metallic salt-blended, free-flowing 2-hydroxy-4-alkoxybenzophenones of the present invention are quite apparent. The unblended ultraviolet absorbers generally contain large pieces of compacted material which cannot be easily broken up whereas the blended free-flowing ultraviolet absorbers of the present invention are highly resistant to caking or compacting and any small agglomerates which do form are readily friable.

The metallic salt-blended, free-flowing 2-hydroxy-4-alkoxybenzophenones exhibit a lower bulk density than the unblended benzophenones heretofore available, that is they exhibit less weight per unit volume. This can be seen by comparison of the apparent densities of the two materials which is a measure of the fluffiness or bulk of the material.

Subjecting the unblended and blended products to a screen sieving test showed that a greater amount of the blended free-flowing material of the present invention passed through the screen than did the unblended material. This confirms the differences in physical appearance between the blended and unblended products and is indicative of the less "compacted state" and more free-flowing nature of the blended product of the present invention.

The same type of screen sieving test applied to both blended and unblended hydroxyalkoxybenzophenones but after compaction for several days at room temperature and at 40° C. again showed that a greater amount of the blended free-flowing ultraviolet absorber passed through the screen than did the unblended material. This was especially noticeable with the material compacted at 40° C. These results clearly demonstrate the greater anti-caking or non-compacting tendencies of the blended free-flowing products over those of the unblended products heretofore available. This comparison also indicates the improved handling properties of the blended products, particularly at elevated temperatures.

The invention is further illustrated by the following examples wherein 2-hydroxy-4-octyloxybenzophenone is used as illustrative of the 2-hydroxy-4-alkoxybenzophenones which may be used in compositions of the present invention.

EXAMPLE 1

Preparation of blends of zinc stearate and 2-hydroxy-4-octyloxybenzophenone

One hundred pounds of 2-hydroxy-4-octyloxybenzophenone was thoroughly admixed with 5 pounds of zinc stearate using a conventional dry blending technique. The benzophenone derivative was pre-screened to eliminate the relatively large hard lumps which could interfere with uniform blending. The resulting blended product contained only small lumps which were readily friable.

EXAMPLE 2

Preparation of blends of magnesium stearate and 2-hydroxy-4-octyloxybenzophenone One hundred pounds of 2-hydroxy-4-octyloxybenzophenone were charged into a blender dryer. Five pounds of magnesium stearate were added to the blender dryer and the two materials were admixed until dry and uniformly blended. The mixture was then ground in a mill to give a finished product for use as a free-flowing ultraviolet absorber for polymers. This product flowed easily and on compaction showed little tendency to form lumps. In comparison, 2-hydroxy-4-octyloxybenzophenone finished by the same procedure but without the addition of magnesium stearate showed a definite tendency to form lumps on compaction. The lumps were not easily broken up and caused substantial difficulty in handling.

EXAMPLE 3

Comparison of compacting tendencies

The compacting tendencies of samples of unblended 2-hydroxy-4-octyloxybenzophenone and magnesium stearate-blended 2-hydroxy-4-octyloxybenzophenone prepared in the manner described in Example 1 were compared using the following test method:

One hundred gram samples which had been passed through a 40 mesh screen were charged into containers and compaction was forced upon the samples by placing them under 500 gram weight loads. The samples were then aged under the standard load for three days. One group at room temperature (25° C.) and one group at 40° C. which is slightly below the reported melting point of 2-hydroxy-4-octyloxybenzophenone. The samples were then vigorously shaken through a standard 40 mesh screen for one minute on a laboratory shaker bin. The amount of sample remaining on the screen was then used as a measure of the degree of compaction which had occurred. The following values shown in Table I below were obtained using the above procedures. These values are averages of three separate determinations.

TABLE I.—COMPACTION TESTS

[Percent material through 40 mesh screen (percent in parentheses is percent remaining on screen]

| Sample | 3 day compaction at— | |
|---|---|---|
|  | 25° C. | 40° C. |
| 2-hydroxy-4-octyloxybenzophenone | 96 (4%) | 79 (21%) |
| Above with 5% magnesium stearate | 100 (0%) | 99 (1%) |
| Above with 5% zinc stearate | 100 (0%) | 99 (1%) |

The results in Table I clearly demonstrate the greater anti-caking or non-compacting tendencies of the free-flowing metal stearate-blended benzophenones of the present invention over those of the unblended benzophenones heretofore available. Moreover, these results clearly demonstrate the improvement in flow characteristics of the stearate blended products, especially the retention of such characteristics at higher temperatures.

EXAMPLE 4

Comparison of apparent densities

Apparent densities for a sample of unblended 2-hydroxy-4-octyloxybenzophenone and for samples of zinc and magnesium stearate-blended 2-hydroxy-4-octyloxybenzophenone as prepared in Example 2 were determined using ASTM Test Method D1895–61T. Table II below summarizes the values obtained. These values are averages of three determinations.

TABLE II

| Sample: | Apparent Densities, lbs./gal. |
|---|---|
| Unblended 2-hydroxy-4-octyloxybenzophenone | 3.5 |
| Zinc stearate blended with 2-hydroxy-4-octyloxybenzophenone (5% zinc stearate) | 3.3 |
| Magnesium stearate blended with 2-hydroxy-4-octyloxybenzophenone (5% magnesium stearate) | 3.1 |

The test method employed was as follows. The samples were poured into a standard funnel with the small end of the funnel closed. The small end of the funnel was then opened to allow the sample to flow freely into a measuring cup. Excess sample was scraped off the top of the cup with a straight edge and the remaining sample in the cup was weighed. The lower value of weight per unit of volume for the blended benzophenones of the present invention clearly indicates that they were less compacted than the unblended benzophenone and indicates their greater fluffiness or bulk.

EXAMPLE 5

Comparison of flow characteristics of master batch blends

The pourability and flow characteristics of polypropylene resin masterbatches with 15% benzophenone ultraviolet absorber with and without the metallic stearate additives of the present invention were compared by the following test method.

In this test, pourability is a measure of the time required for a standardized quantity of material to flow through a funnel of specified dimensions according to the procedure outlined in ASTM Method D1895–61T, "Apparent Density Bulk Factor and Pourability of Plastic Materials."

For this test, 100 g. each of a masterbatch of polypropylene resin thoroughly admixed with 15% of the ultraviolet absorber is charged to a standard container. The additive before blending with polypropylene is pre-screened through a 40 mesh sieve and is then thoroughly and evenly mixed into the resin mass. The sample is then compacted by placing it under this load, it is charged into a standard funnel and a flow return or flowability determination is made according to the above cited ASTM method.

Tests were run on the resin containing the ultraviolet absorber additive alone, containing the additive with 5% magnesium stearate and with the additive containing 5% zinc stearate in accordance with the present invention. Tests were run after forced compaction as described hereinabove for three days at 40° C. At such a temperature, the flow characteristic of the resin with the ultraviolet additive alone was found to be especially poor. The results of the pourability tests are shown in Table III below wherein 2-hydroxy-4-octyloxybenzophenone was used illustratively, as the UV absorber additive.

TABLE III

Pourability of resin masterbatches

| Sample: | After three days at 40° C. under weight load |
|---|---|
| 15% ultraviolet additive in polypropylene masterbatch | Did not flow. |
| 15% ultraviolet additive containing 5% magnesium stearate in polypropylene masterbatch | 20.0 seconds. |
| 15% ultraviolet additive containing 5% zinc stearate in polypropylene masterbatch | 20.8 seconds. |

What is claimed is:

1. A free-flowing composition comprising a 2-hydroxy-4-alkoxybenzophenone having the formula:

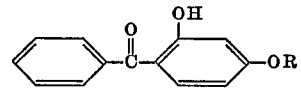

wherein R is an alkyl group containing from 1 to about 20 carbon atoms and having a melting point below about 70° C., and from about 1% to about 10% by weight of a metallic salt of a fatty acid, said salt being selected from the group consisting of the magnesium and zinc salts of saturated fatty acids containing from about 12 to about 20 carbon atoms.

2. A free-flowing composition according to claim 1 wherein the alkyl group of the 2-hydroxy-4-alkoxybenzophenone contains from about 8 to about 12 carbon atoms.

3. A free-flowing composition according to claim 1 wherein said composition contains from about 4½% to about 5½% by weight of the metallic salt of a fatty acid.

4. A free-flowing composition according to claim 1 wherein the metallic salt of a fatty acid is a stearate of zinc or magnesium.

5. A process for imparting free-flowing characteristics to low melting 2-hydroxy-4-alkoxybenzophenones having the formula:

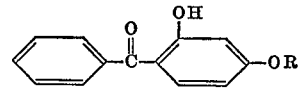

wherein R is an alkyl group containing from 1 to about 20 carbon atoms and having a melting point below about 70° C., comprising admixing said alkoxybenzophenone and from about 1% to about 10% by weight of a metallic salt of a fatty acid, said salt being selected from the group consisting of the magnesium and zinc salts of saturated fatty acids containing from about 12 to about 20 carbon atoms, whereby said free-flowing characteristics are retained at temperatures approaching the melting point of said alkoxybenzophenones.

6. A process according to claim 5 wherein said metallic salt is admixed in amounts of from about 4½% to about 5½% by weight.

7. A process according to claim 5 wherein the alkyl group of the 2-hydroxy-4-alkoxybenzophenone contains from about 8 to about 12 carbon atoms.

8. A process according to claim 5 wherein the metallic salt of a fatty acid is a stearate of zinc or magnesium.

(References on following page)

References Cited

UNITED STATES PATENTS

| | | | |
|---|---|---|---|
| 2,818,400 | 12/1957 | Forster | 260—591 |
| 2,861,053 | 11/1968 | Lappin et al. | 260—591 |

OTHER REFERENCES

Remington's Practice of Pharmacy, pp. 448, 1799, 1800, 1961 edition.

Merck Index, p. 448 (8th edition), 1968.
Worms, Chem. Abstracts 54, 11504i (1960).
Du Pont, Chem. Abstracts, 65, 17116g (1966).
Monsanto, Chem. Abstracts 55, 7917g (1961).

DANIEL D. HORWITZ, Primary Examiner

U.S. Cl. X.R.

260—49.75, 49.95; 252—383, 300